US006998589B2

(12) United States Patent
Yano et al.

(10) Patent No.: US 6,998,589 B2
(45) Date of Patent: Feb. 14, 2006

(54) IMAGE HEATING APPARATUS USING FLEXIBLE SLEEVE AND SLEEVE THEREOF

(75) Inventors: Hideyuki Yano, Shizuoka (JP); Masahiro Suzuki, Shizuoka (JP); Katsuhisa Matsunaka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 10/360,689

(22) Filed: Feb. 10, 2003

(65) Prior Publication Data

US 2003/0173356 A1 Sep. 18, 2003

(30) Foreign Application Priority Data

Feb. 12, 2002 (JP) ............................ 2002-034088

(51) Int. Cl.
*H05B 6/14* (2006.01)

(52) U.S. Cl. ...................................... 219/619; 399/329

(58) Field of Classification Search ................ 219/619, 219/216, 543, 469; 399/328–333, 326, 69; 514/317

See application file for complete search history.

(56) References Cited

U.S. PATENT DOCUMENTS

| | | | | |
|---|---|---|---|---|
| 4,970,219 A | 11/1990 | Effland et al. | | 514/339 |
| 4,983,615 A | 1/1991 | Effland et al. | | 514/337 |
| 5,034,403 A | 7/1991 | Effland et al. | | 514/338 |
| 5,083,168 A | 1/1992 | Kusaka et al. | | 355/285 |
| 5,149,941 A | 9/1992 | Hirabayashi et al. | | 219/216 |
| 5,162,634 A | 11/1992 | Kusaka et al. | | 219/216 |
| 5,210,579 A | 5/1993 | Setoriyama et al. | | 355/285 |
| 5,221,682 A | 6/1993 | Effland et al. | | 514/349 |
| 5,262,834 A | 11/1993 | Kusaka et al. | | 355/285 |
| 5,264,902 A | 11/1993 | Suwa et al. | | 355/282 |
| 5,300,997 A | 4/1994 | Hirabayashi et al. | | 355/285 |
| 5,343,280 A | 8/1994 | Hirabayashi et al. | | 355/285 |
| 5,405,856 A | 4/1995 | Effland et al. | | 514/349 |
| 5,525,775 A | 6/1996 | Setoriyama et al. | | 219/216 |
| 5,767,484 A | 6/1998 | Hirabayashi et al. | | 219/216 |
| 6,031,215 A * | 2/2000 | Nanataki et al. | | 219/619 |
| 6,131,010 A | 10/2000 | Kume et al. | | 399/333 |
| 6,263,172 B1 * | 7/2001 | Suzuki et al. | | 399/67 |
| 6,456,819 B1 * | 9/2002 | Abe et al. | | 399/329 |
| 6,564,033 B1 * | 5/2003 | Zhou et al. | | 399/329 |
| 6,579,888 B1 * | 6/2003 | Reitberg | | 514/317 |
| 2002/0034621 A1 | 3/2002 | Shida et al. | | |
| 2002/0110394 A1 * | 8/2002 | Takeuchi et al. | | 399/328 |
| 2002/0146259 A1 | 10/2002 | Zhou et al. | | 399/329 |

FOREIGN PATENT DOCUMENTS

JP 51-109739 9/1976

(Continued)

*Primary Examiner*—Quang T. Van
(74) *Attorney, Agent, or Firm*—Fitzpatrick, Cella, Harper & Scinto

(57) ABSTRACT

An image heating apparatus according to the present invention includes a fixing sleeve, a guide member that is arranged in an inner circumferential section of fixing sleeve and rotatably holds the fixing sleeve, a pressure roller that press-contacts with the guide member through the fixing sleeve and forms a fixing nip, and heating unit that heating the fixing sleeve and heats paper conveyed in the fixing nip with the rotation of the fixing sleeve. Grease that increases slide property is applied to an interface between the fixing sleeve and guide member, and the surface roughness of at least an area of an inside surface of the fixing sleeve contacting with the above-described guide member is made to be 0.05 or more in an Rz value.

19 Claims, 2 Drawing Sheets

FOREIGN PATENT DOCUMENTS

| | | |
|---|---|---|
| JP | 63-313182 | 12/1988 |
| JP | 2-157878 | 6/1990 |
| JP | 4-44075 | 2/1992 |
| JP | 4-204980 | 7/1992 |
| JP | 5-27619 | 2/1993 |
| JP | 8-64353 | 3/1996 |
| JP | 9-319242 | 12/1997 |
| JP | 11-102133 | 4/1999 |
| JP | 2001-341231 | 12/2001 |

* cited by examiner

IMAGE HEATING APPARATUS USING FLEXIBLE SLEEVE AND SLEEVE THEREOF

BACKGROUND OF THE INVENTION

1. Field of the Invention

The present invention relates to an image heating apparatus suitable for being used as a heating fixing-device installed in a copier, a printer, etc., and in particular, to an image heating apparatus that uses a flexible sleeve.

2. Related Background Art

Heat roller type apparatuses are widely used as fixing apparatuses to heat and fix each unfixed toner image, which is indirectly or directly formed and born in a recording material, on a recording surface as a permanently fixed picture with proper image forming process measures such as electrophotographic recording technology and electrostatic recording technology. Recently, sleeve-heating type apparatuses have been put into practical use from the viewpoint of quick start and energy saving. In addition, electromagnetic induction heating type of fixing apparatuses heating each sleeve itself that consists of metal are also proposed.

a) Sleeve Heating Type of Fixing Apparatus

Sleeve heating type of fixing apparatuses are proposed in, for example, Japanese Patent Application Laid-Open No. 63-313182, Japanese Patent Application Laid-Open No. 2-157878, Japanese Patent Application Laid-Open No. 4-44075, Japanese Patent Application Laid-Open No. 4-204980, and the like.

That is, these are apparatuses of fixing each unfixed toner image on a surface of a recording material with each applied pressure of a nip section with giving the heat of a ceramic heater through a sleeve by forming the nip section with sandwiching the heat-resistant sleeve (fixing sleeve) between a ceramic heater serving as a heating body and a pressure roller serving as a pressure member, introducing a recording material, where the unfixed toner image is formed and born, between the sleeve of the nip section and the pressure roller, and sandwiching and conveying the recording material with the sleeve.

This sleeve heating type of fixing apparatus can constitute an on-demand type apparatus by using members with low thermal capacity for the ceramic heater and sleeve. Since what is necessary is to heat the ceramic heater heated to predetermined fixing temperature by energizing the ceramic heater, which is a heat source, only when image formation is executed, there are advantages to a short waiting time (quick start) from the power-on of a power supply of an image forming apparatus to a state ready for image formation, including a significantly small power consumption (power saving) at a standby state, etc.

b) Electromagnetic Induction Heating Type of Fixing Apparatus

In Japanese Utility Model Application Laid-Open No. 51-109739, an induction heating type of fixing apparatus is disclosed, the fixing apparatus which induces an eddy current in a metal layer of a fixing sleeve by a magnetic flux and makes the fixing sleeve heat by its Joule heat. This can make the fixing sleeve heated directly by using the generation of the induced current, and hence, achieves fixing process more highly effective than a heat roller type of fixing apparatus where a heat source is a halogen lamp.

Regardless of heating methods such as a sleeve heating method and an electromagnetic induction heating method, in color image fixing apparatuses, in order to improve image quality in special paper such as overhead transparency films (OHT films) and glossy paper, it is common for each apparatus to have a special print mode.

Since a highly glossy color image is often regarded as being in high quality generally, it is desirable in the print, which uses glossy paper, to fix a surface of the toner image more smoothly than in normal printing.

For this, it is effective to give plenty of heat in a fixing nip by slowly performing the fixing by slowing down fixing speed. A print mode that performs such fixing is called a gloss mode etc., and aims to obtain a glossy image by optimizing print speed, fixing temperature, etc.

In addition, in the fixing of an OHT film, the smoothness of a surface of a toner image is needed similarly to that in the gloss mode. Since OHT permeability decreases if sufficient fixing is not obtained, the image becomes a projection image that is impure or subfusc.

In the OHT mode also, it is possible, similarly to the gloss mode, to improve the OHT permeability by optimizing the fixing temperature by slowing down the fixing speed.

Nevertheless, there are the following problems when low-speed print like the gloss mode, OHT mode, etc. was performed in a fixing apparatus with the construction of using a flexible sleeve as a rotating body described above.

Since the inside surface of the sleeve and a supporting member frictionally contact with each other when the sleeve rotates, driving load is large. In order to decrease this driving load, it is very important to decrease the dynamical friction resistance between the inside surface of the sleeve and the supporting member. For example, as proposed in Japanese Patent Application Laid-Open No. 5-27619, slide property is secured by making lubricant such as heat-resistant grease intervene between the inside surface of the sleeve and the supporting member. In addition, the slide property is secured by decreasing a contact area of the sleeve with the supporting member by providing a rib in the sleeve supporting member.

Nevertheless, since it becomes difficult at the time of low-speed printing for grease to enter into an interface between a sliding plate and the sleeve because driving load rises due to high viscous drag of grease coated for securing slide property, and the adhesion of the sliding plate and sleeve increases due to the slow movement of the sleeve, there arises a problem that the rotation of the sleeve cannot follow the rotation of the drive roller.

Specifically, there arises a phenomenon that a toner image distorts since a slip arises between a surface of the glossy paper or OHT film, and a sleeve surface at the low-speed printing.

This phenomenon tends to arise in a state that the sliding resistance between the inside surface of the sleeve and a sleeve guide is large, and the frictional resistance between the surface of the OHT film and the sleeve surface is lowered. In an actual use, the severest state is a state that plenty of toner images are recorded on the OHT film.

In addition, not to say a defective image due to complete slipping, an unusual sound that is called a stick-slip (stick-slip phenomenon) may arise since the minute drive irregularity between the sleeve surface and a surface of the sliding plate causes the vibration between the inside surface of the sleeve and the sliding plate.

Such a stick-slip phenomenon remarkably arises in a state of low speed and high applied-pressure, which is a phenomenon quite contradictory to the gloss improving means for color image quality improvement.

As described above, in a fixing apparatus of a color image forming apparatus that fixes a full color image where plenty of toner is attached, it is necessary to apply the applied pressure, which is larger than that of a fixing apparatus for a conventional mono-color image, to the nip section so as to improve the gloss mode and the permeability of an OHT image. Hence, since the bearing stress between a rotating body and the supporting member in the nip section become larger, frictional resistance becomes large in particular. Therefore, the above-mentioned slip and stick-slip become very serious problems in the color image forming apparatus.

SUMMARY OF THE INVENTION

The present invention is devised in consideration of the above-mentioned issues, and aims to provide an image heating apparatus, where a flexible sleeve rotates smoothly, and the flexible sleeve.

Another object of the present invention is to provide an image heating apparatus, which can reduce the driving torque of a flexible sleeve, and the flexible sleeve.

Still another object of the present invention is to provide an image heating apparatus comprising:

a flexible sleeve;

a sliding member contacting with an inside surface of the sleeve; and a pressure member forming a nip section with the sliding member with sandwiching the sleeve, a recording material moving between the sleeve and the pressure member, wherein a polyimide resin layer whose glass transition point is 320° C. or more is provided on a surface contacting with the sliding member of the sleeve.

A further object of the present invention is to provide a flexible sleeve comprising:

a base layer; and an inside resin layer, a material of the inside resin layer being a polyimide resin whose glass transition point is 320° C. or more.

A still further object of the present invention is to provide an image heating apparatus comprising:

a flexible sleeve;

a sliding member contacting with an inside surface of the sleeve;

a pressure member forming a nip section with the sliding member with sandwiching the sleeve, a recording material moving between the sleeve and the pressure member, wherein a resin layer is provided on a surface of the sleeve contacting with the sliding member and a surface of the resin layer in made a rough surface by particles dispersed in the resin layer.

Another object of the present invention is to provide a flexible sleeve comprising:

a base layer; and an inside resin layer, a surface of which is made a rough surface by particles dispersed in the resin layer.

Still another object of the present invention is to provide an image heating apparatus comprising:

a flexible sleeve having a metal layer;

magnetic field generating means for generating an eddy current in the metal layer:

a sliding member contacting with an inside surface of the sleeve; and a pressure member forming a nip section with the sliding member with sandwiching the sleeve, a recording material moving between the sleeve and the pressure member, wherein the surface roughness Rz of the surface of the sleeve contacting with the sliding member is 0.05 to 0.5 μm.

Further objects of the present invention will be clarified by reading the following detailed explanation with referring to accompanying drawings.

DESCRIPTION OF THE PREFERRED EMBODIMENTS

Hereafter, embodiments of the present invention will be described.

(Embodiment 1)

Figure 1:
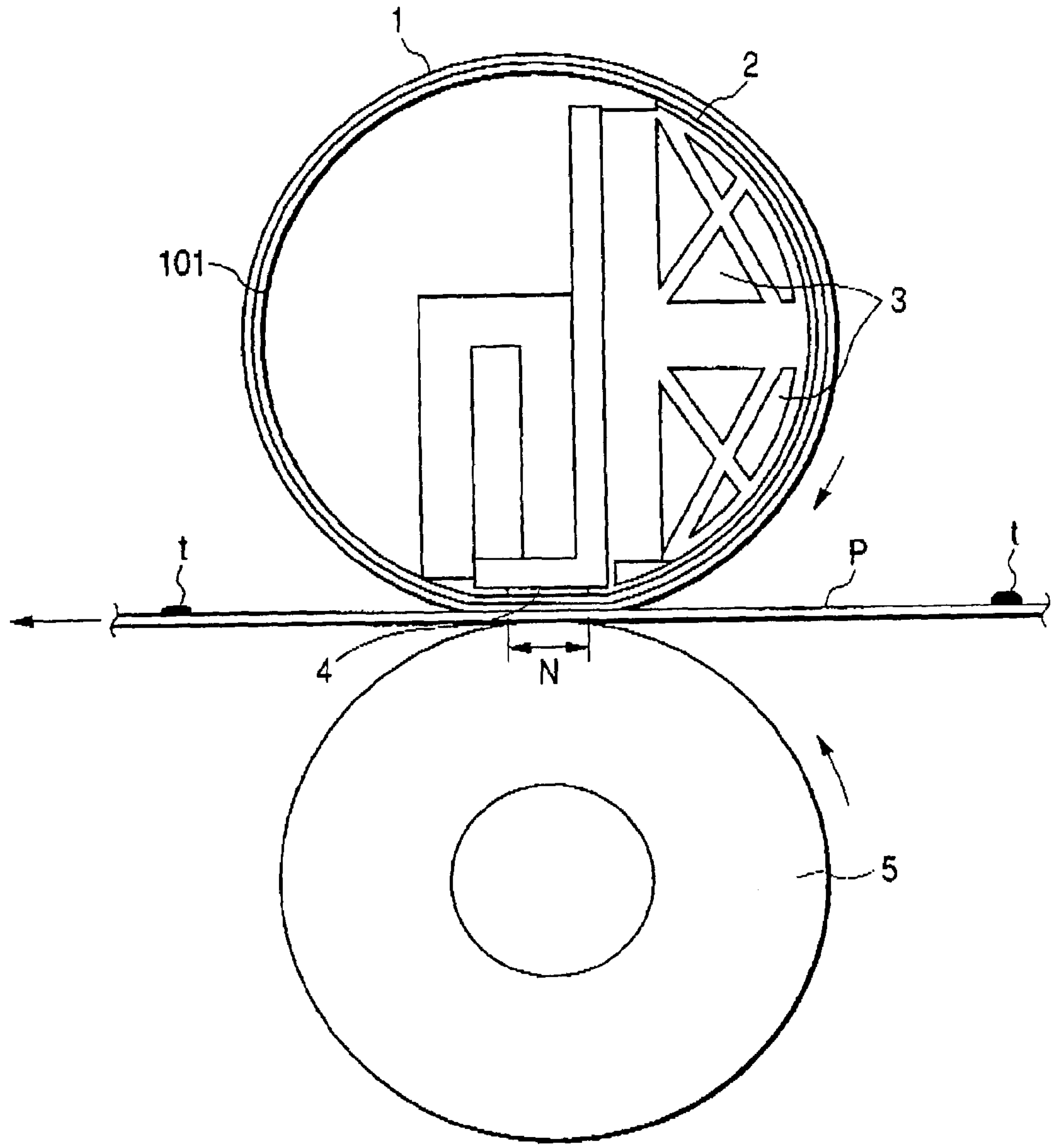
FIG. 1 is a schematic sectional diagram of a fixing Apparatus to which the present invention is applied.

FIG. 1 is a vertical sectional view of a fixing apparatus showing a first embodiment of the present invention.

In FIG. 1, a fixing sleeve (flexible sleeve) 1 formed cylindrically is formed in layer structure shown in FIG. 2, and this will be described later.

Reference numeral 2 denotes a sleeve guide member whose transverse section has a shape of a semicircle gutter, and the fixing sleeve 1 is loosely fit over the outside of this sleeve guide member 2.

Magnetic field generating means 3 arranged inside the sleeve guide member 2 comprises an exciting coil and a T-shaped magnetic core (core material).

An elastic pressure roller (pressure member) 5 forms a fixing nip section N with the sleeve guide member 2 with sandwiching the fixing sleeves 1. Predetermined pressure is applied to both ends of the sleeve guide member 2 and both ends of the pressure roller 5. The above-mentioned magnetic field generating means 3 is arranged in the upstream side of the fixing nip section N in view of the rotary direction of the fixing sleeve 1. Hence, a magnetic field generated by the magnetic field generating means 3 acts on the fixing sleeve 1 in the upstream side of the fixing nip section N in view of the rotary direction of the fixing sleeve 1.

The pressure roller 5 is rotatably driven counterclockwise by driving means as shown by an arrow in FIG. 1. When this pressure roller 5 rotates, the fixing sleeve 1 rotates clockwise as shown by the arrow in FIG. 1 since a friction force is generated between the pressure roller 5 and an outside surface of the fixing sleeve 1. The fixing sleeve 1 rotates around the outer circumference of the sleeve guide member 2 at circumferential speed almost corresponding to the circumferential speed of the pressure roller 5 while its inside surface slides in the fixing nip section N with closely contacting with a lower surface of the sleeve guide member 2.

In addition, in this embodiment, the sliding plate 4 integrally fit in the sleeve guide member 2 plays a role of decreasing the friction force with the inside surface of the sleeve 1 in the fixing nip section N.

Specifically, the sliding plate 4 had the construction of coating glass on a ceramic board (a surface sliding with the fixing sleeve 1). The fixing sleeve 1 in this embodiment slides with this sliding plate 4 in the fixing nip section. It is also good not to provide the sliding plate 4, and, when the sliding plate 4 is not provided, the fixing sleeve 1 slides directly on the sleeve guide member 2.

The sleeve guide member 2 plays a role of pressurizing the fixing nip section N, supporting an exciting coil and a magnetic core that serve as magnetic field generating means, supporting the fixing Sleeve, and achieving conveyance stability at the time of the sleeve rotating. This sleeve guide member 2 is an insulated member that does not disturb the pass of a magnetic flux, and a material that can endure a heavy load is used for this.

The exciting coil generates an alternating magnetic flux by an alternating current supplied from an excitation circuit not shown. The alternating magnetic flux acts on the sleeve 1 in two places in the upstream side of the fixing nip section N in view of the sleeve's rotary direction by a T-shaped magnetic core, and generates an eddy current in an electromagnetic induction heat generating layer (metal layer 9) of the fixing sleeve. This eddy current generates Joule heat by the specific resistance of the electromagnetic induction heat generating layer.

Since a region of the fixing sleeve that generates heat by the alternating magnetic flux moves to the nip section N by the fixing sleeve rotating, the fixing nip section N is heated high effectively.

The fixing nip section N is thermally controlled by a temperature control system including temperature detection means and an excitation circuit, which are not shown, so as to maintain predetermined temperature by controlling current supply to the exciting coil.

Then, since the cylindrical fixing sleeve 1 rotates on the outer circumference of the sleeve guide member 2 with generating heat by the rotation of the pressure roller 5, the fixing nip section N rises at the predetermined temperature. A recording material P in which an unfixed toner image is formed by an image forming section not shown is introduced between the fixing sleeve and pressure roller 5 in the fixing nip section N with an image face turning upward, that is, with the image face facing a surface of the fixing sleeve. In the fixing nip section N, the image face closely contacts with the outside surface of the fixing sleeve to be sandwiched and conveyed in the fixing nip section N with the fixing sleeve 1. On the way of the recording material P being sandwiched and conveyed with the fixing sleeve 1 in this fixing nip section N, the unfixed toner image is heated by the heat of the fixing sleeve 1 so that a toner image t is heatedly fixed on the recording material P. When passing the fixing nip section N, the recording material P is separated from the outside surface of the rotating fixing sleeve to be conveyed and discharged.

Figure 2:
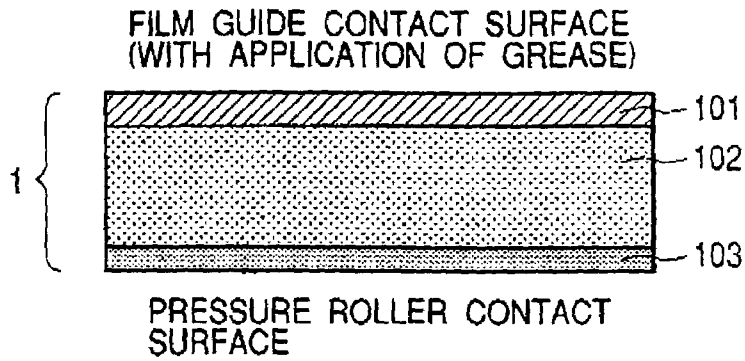
FIG. 2 is a structural diagram of a sleeve according to a first embodiment.

FIG. 2 is a schematic diagram of layer structure of the fixing sleeve 1 in this embodiment. The fixing sleeve 1 according to this embodiment is a complex structure comprising a heat generating layer 101 formed with a metal sleeve etc. that becomes a base layer of the electromagnetic induction heat generating fixing-sleeve 1, an elastic layer 102 stacked on an outside surface thereof, and a releasing layer 103 stacked on an outside surface thereof. It is also good to provide each primer layer (not shown) between each pair of layers for the bond between the heat generating layer 101 and elastic layer 102, and the bond between the elastic layer 102 and releasing layer 103.

In the fixing sleeve 1 that has approximately cylindrical geometry, the heat generating layer 101 is on its inside surface, and the releasing layer 103 is on its outside surface. Since an eddy current is generated in the above-described heat generating layer 101 by an alternating magnetic flux acting on the heat generating layer 101, the above-described heat generating layer 101 generates heat. The heat heats the fixing sleeve 101 through the elastic layer 102 and releasing layers 103 to heat the recording material P as a heated material conveyed into the above-described fixing nip N, and the toner image T Is fixed with heat.

It is preferable that the elastic layer 102 is made of a material with good thermostability and good heat conductivity such as silicone rubber, fluorine rubber, and fluorosilicone rubber, whose thickness is 10 to 500 $\mu$m. The thickness of this elastic layer 103 is necessary for vouching for the quality of a fixed image.

When a color image, in particular, a photographic image etc. is printed, a solid image is formed over a large area on the recording material P. In this case, since irregular heating arises if the heating surface (releasing layer) cannot follow the convexo-concave of a recording material or the convexo-concave of a toner layer, irregular brightness arises in the image in portions where heat transfer quantity is large and portions where it is small. A portion where the heat transfer quantity is large has high glossiness, and a portion where the heat transfer quantity is small has low glossiness.

Since it is not possible to follow the convexo-concave of the recording material or toner layer if the thickness of the elastic layer 102 is 10 $\mu$m or less, irregular image brightness is generated. In addition, since the thermal resistance of the elastic layer becomes large if the thickness of the elastic layer 102 is more than 1,000 $\mu$m, it becomes difficult to achieve quick start. It is more preferable that the thickness of the elastic layer 102 is 50 to 500 $\mu$m.

Since it is not possible to follow the convexo-concave of the recording material or toner layer when the hardness of the elastic layer 102 is too high, irregular image brightness is generated. Then, it is good that the hardness of the elastic layer is 60° (JIS-A) or less, or more preferably, 45° (JIS-A) or less. Silicone rubber with 20° was used in this embodiment.

As for the releasing layer 103, it is possible to select a material with good release property and thermostability such as a fluorocarbon resin, a silicone resin, fluorosilicone rubber, fluorine rubber, silicone rubber, PFA, PTFE, and FEP.

It is preferable that the thickness of the releasing layer 103 is 1 to 100 $\mu$m. When the thickness of the releasing layer 103 is thinner than 1 $\mu$m, there arise problems that a portion where the release property is bad arises due to the uneven coating of a coating film, and that durability is insufficient. In addition, when the releasing layer 103 exceeds 100 $\mu$m thick, there arises a problem that heat conduction deteriorates. In particular, in the case of a resin-based releasing layer, hardness becomes too high, and hence, an effect of the elastic layer is lost. In this embodiment, a PFA tube of 50 $\mu$m thick was used as the releasing layer 103.

As for the heat generating layer 101, it is recommendable to use ferromagnetic metal such as nickel, iron, ferromagnetic SUS, and a nickel-cobalt alloy. It is acceptable to use non-magnetic metal, but, more preferably, it is recommendable to use metal such as nickel, iron, magnetic stainless steel, and a cobalt-nickel alloy, which well absorb magnetic flux.

In this embodiment, nickel was formed into a metal layer by an electroforming method in the viewpoint of forming the metal layer that is good in thickness accuracy and good In form accuracy by forming convexo-concave in a mold surface at the time of production.

It is preferable that its thickness is thicker than the skin depth shown by the following formula and is 200 $\mu$m or less. The skin depth $\sigma$ (m) is expressed as $\sigma=503\times(\rho/£\mu)^{1/2}$ by using a frequency f (Hz) of the excitation circuit, permeability $\mu$, and specific resistance $\rho$ ($\Omega$m).

This shows the depth of absorption of an electromagnetic wave used in electromagnetic induction, and the strength of the electromagnetic wave in points that are deeper than this becomes 1/e or less. Conversely, most energy is absorbed by this depth.

It is preferable that the thickness of the heat generating layer is 1 to 100 μm. When the thickness of the heat generating layer is smaller than 1 μm, efficiency deteriorates since most electromagnetic energy cannot be absorbed. In addition, since stiffness rises too much when the heat generating layer exceeds 100 μm, and flexibility deteriorates, it is not realistic to use it as a rotating body. Hence, it is preferable that the thickness of the heat generating layer 101 is 1 to 100 μm. In this embodiment, the thickness of the nickel layer was made to be 50 μm.

In this embodiment, the heat generating layer 101 made of nickel was formed by the electroforming method. The electroforming method is a kind of plating. Metallic crystals are grown around a matrix by arranging electrolytic waves around the matrix, flowing current to these, and electrophoresing metal ions, and a sleeved metallic cylinder was formed. At this time, when a surface of the matrix is made a rough surface, a surface of the electroformed sleeve that is formed is also transcribed in the same geometry, and hence, it is possible to perform highly accurate roughening.

In this embodiment, a sandblasted aluminum rod was made an inner mold since it was desired to make the inside surface of the sleeve a rough surface, and nickel was grown on this surface.

Next, examples of performing experiments by using sleeves whose inside surfaces were made rough surfaces at several levels will be shown in this embodiment. Surface roughing was achieved by sandblasting surfaces of matrixes with different levels of grits when the nickel sleeves were produced.

As shown in Table 1, samples 1 to 5 whose surface roughness of the inside surfaces of the sleeves was set at 0.01, 0.03, 0.05, 0.1, and 0.5 μm in Rz (ten point height of irregularities) were mounted in the induction heating type of fixing apparatus shown beforehand. Then, a 100-copy print test was performed by using each sample in a usual plain paper print mode and an OHT print mode where process speed was dropped to ¼. The OHT mode aims to increase OHT permeability by applying enough quantity of heat by securing time, when the OHT film passes the fixing nip, through the drop of the fixing speed.

TABLE 1

| Sample | 1 | 2 | 3 | 4 | 5 |
|---|---|---|---|---|---|
| Surface Roughness (Rz) | 0.01 μm | 0.03 μm | 0.05 μm | 0.1 μm | 0.5 μm |
| Stick-slip | no good | no good | good | good | good |
| Slip | no good | good | good | good | good |
| Scraping | good | good | good | good | no good |

As shown in Table 1, an image slip arose in the OHT mode when Rz was 0.01 μm or less in sample 1, and an unusual sound caused by the stick-slip was generated when Rz was 0.03 μm or less in samples 2.

Nevertheless, when the surface roughness (Rz) of the inside surface of the sleeve was 0.05 μm or more in samples 3 to 5, such a problem was not generated because of slide property being secured since the convexo-concave of the inside surface of the sleeve carried grease into the fixing nip.

Nevertheless, on the other hand, when the surface roughness Rz is too large, surfaces of the convexo-concave are scraped so that sliding resistance increases by shavings, and hence, the slip and stick-slip are similarly generated.

Since such a problem was generated in this embodiment when the surface roughness Rz was 0.5 μm or more, it is necessary to control the surface roughness Rz of the inside surface of the sleeve within the range of 0.05 to 0.5 μm.

As mentioned above, in this embodiment, it became possible to prevent the slip and stick-slip in a color fixing apparatus, where applied pressure was strong and it was very severe due to the existence of the low-speed print mode to rotate a flexible sleeve, by making the inside surface of the sleeve an optimally rough surface.

In this embodiment, in the induction heating type of fixing apparatus, grease coated on the inside surface of the sleeve is carried smoothly into the sliding nip by making the surface roughness (Rz) of the inside surface of a sleeve-shaped rotating body rubbed by a sleeve guide be 0.05 to 0.5 μm. Hence, it is possible to prevent the slip and stick-slip that is remarkable in a color image fixing apparatus.

In the color image fixing apparatus, they say that high applied-pressure and slow fixing-speed are needed so as to obtain high glossiness and excellent OHT permeability. In the fixing apparatus where a fixing nip becomes a sliding section, problems are an image slip, caused by high sliding resistance, and an unusual sound caused by a stick-slip.

In such a fixing apparatus, though such means that increases slide property is used generally by coating grease on an inside surface of a sleeve, as described above, there arises a problem that an original objective of applying grease is not achieved, since grease cannot enter inside a nip in a fixing apparatus that needs high applied-pressure.

In order to prevent such a problem, this embodiment aims to secure slide property by adapting the grease to this convexo-concave and carrying the grease into the nip by making a metal surface of a heat generating layer that is a most inner layer of the sleeve a rough surface.

(Embodiment 2)

Figure 3:
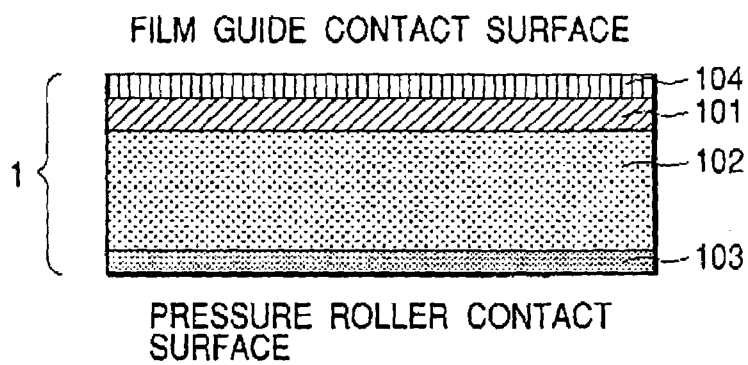
FIG. 3 is a structural diagram of a sleeve according to a second embodiment.

FIG. 3 is a structural diagram of a sleeve that shows a second embodiment of the present invention.

A fixing sleeve 1 according to this embodiment is constituted by providing a sliding layer 104 in an inner circumference of the heat generating layer 101 of the fixing sleeve according to the first embodiment.

In this second embodiment, a sleeve that has the high surface hardness of the inner circumferential surface of the sleeve, and high slide property, and can prevent a stick-slip by newly providing the polyimide resin sliding layer 104 in the inside surface of the sleeve and selecting such polyimide material whose glass transition point is 320° C. or more.

In the construction of the fixing sleeve 1, it becomes possible to separate functions of heat generation and sliding by providing the sliding layer 104 in the inside surface (an opposite side to a side where an elastic layer of the heat generating layer is arranged) of the sleeve guide of the heat generating layer 101. Hence, higher-performance sleeve can be achieved.

It is considerable to use one of heat-resistant resins such as a fluorocarbon resin, a polyimide resin, a polyamide resin, a polyamide-imide resin, a PEEK resin, a PES resin, a PPS resin, a PFA resin, a PTFE resin, and an FEP resin as the sliding layer 104. Nevertheless, since polyimide has high slide property, a low friction coefficient with the material (ceramic) of the sleeve guide facing each other, and excellent thermostability, the polyimide is optimum among them as the sliding material in the induction heating type of fixing apparatus with high applied-pressure.

Nevertheless, among various grades marketed as polyimide, there are grades suitable as the sliding layer 104 of the fixing apparatus according to their characteristics, and grades not to be so.

Specifically, there are a lot of grades generating such problems that frictional resistance rises by deformation since surface hardness decreases because of their physical properties at the time of use under such a condition as fixing temperature (for example 160° to 190° C.), and a stick-slip is caused since chattering is caused betweenwith the other party of sliding.

In order to avoid such problems, it is effective to use polyimide with a high glass transition point as the sliding layer 104. Specifically, it was found that it became possible to prevent the stick-slip by using such a material grade of polyimide whose glass transition point (Tg) exceeds 320° C.

A specific example will be shown. Though an electrophotographic apparatus and a fixing apparatus used in this embodiment are the same as ones used in the first embodiment, control is performed in usual print so that the temperature detected by a thermistor in the fixing device may be always 185° C.

Actually, since the temperature of a paper-fed section in case of small size of paper being fed may become about 20° C. higher than this, the temperature of the sliding layer reaches about 200° C. in the inside surface of the sleeve.

The characteristics of the resin under this actual operating temperature relate to the behavior of an actual stick-slip. Specifically, if polyimide with a low glass transition point is used, the resin begins to soften as the fixing device becomes hot, and hence, chattering is generated between with the sleeve guide or a friction coefficient rises.

Then, five types of polyimide varnish were prepared as shown in Table 2, and the sliding layer 104 was formed in the inside surface of the sleeve made of nickel by using each polyimide varnish. Hence, samples of sleeves completed were five types, that is, examples 1 and 2, and comparative examples 1 to 3.

U-varnish S (glass transition point: 350° C. or more) made by Ube Industries Ltd. was used as the sliding layer in the first example. Since this varnish is applied to the inside surface of the sleeve made of nickel and imidization advances with a solvent being removed by burning the varnish at high temperature, a polyimide film is formed. After application, the temperature was gradually raised from 120° C. gradually, and finally, baking was done at 350° C. for one hour.

It is preferable that the thickness of the sliding layer 104 is 3 to 100 μm. The layer is worn out by rubbing with the sleeve guide of the sliding layer when the thickness is thinner than 3 μm, and an original role is not played. On the other hand, the distance from a magnetic core and an exciting coil to a heat generating layer is enlarged when the thickness exceeds 100 μm, and hence, magnetic flux is not absorbed enough by the heat generating layer.

Semicofine SP341 (glass transition point: about 330° C.) made by Toray Industries, Inc. was used as the sliding layer in example 2. A forming method to the inside surface of the sleeve is the same as that in example 1.

Comparative examples 1 to 3 are as shown in Table 2, and a forming method of these sliding layers on the inside surface of the sleeve is also the same as that in example 1.

TABLE 2

| | Polyimide Varnish | Baking Conditions |
|---|---|---|
| Example 1 | U-varnish S (Ube Industries; Tg = 350° C. or more) | 120° C. → 200° C. (one hour) ⟹ 200° C. → 350° C. (30 minutes) ⟹ 350° C. (one hour) |
| Example 2 | Semicofine SP341 (Toray: Tg = 330° C.) | 120° C. → 200° C. (one hour) ⟹ 200° C. → 350° C. (30 minutes) ⟹ 350° C. (one hour) |
| Comparative Example 1 | U-varnish A (Ube Industries: Tg = 230° C.) | 120° C. → 200° C. (one hour) ⟹ 200° C. → 350° C. (30 minutes) ⟹ 350° C. (one hour) |
| Comparative Example 2 | Semicofine SP811 (Toray: Tg = 300° C.) | 120° C. → 200° C. (one hour) ⟹ 200° C. → 350° C. (30 minutes) ⟹ 350° C. (one hour) |
| Comparative Example 3 | Semicofine SP483 (Toray: Tg = 300° C.) | 120° C. → 200° C. (one hour) ⟹ 200° C. → 350° C. (30 minutes) ⟹ 350° C. (one hour) |

These sleeves were mounted in the induction heating type of fixing device shown in the previous example, and a 100-copy print test was performed in a plain paper print mode (normal mode) and an OHT print mode (low-speed mode) where process speed was dropped to ¼ of the normal mode. The OHT mode aims to increase OHT permeability by applying enough quantity of heat by securing time, when the OHT film passes the fixing nip, through the drop of the fixing speed.

In consequence, it was found as shown in the following Table 3 that it was possible to prevent a defective image caused by a slip and an unusual sound caused by a stick-slip if polyimide resins (examples 1 and 2) whose glass transition points were high, and it was not possible to exclude such problems in the case of polyimide resins with low glass transition points (comparative examples 1 to 3). From this consequence, it was found that it was preferable that polyimide used as a sliding layer had 320° C. or more of glass transition point.

TABLE 3

| | Example 1 | Example 2 | Comparative Example 1 | Comparative Example 2 | Comparative Example 3 |
|---|---|---|---|---|---|
| Stick-slip | good | good | no good | no good | no good |

It became possible to prevent a slip and a stick-slip in a color fixing apparatus, where applied pressure was strong and durability was very severe due to the existence of the low-speed print mode by making the sliding layer 104, provided in the Inside surface of the sleeve, with a polyimide resin with good thermostability and slide property as examples 1 and 2, and, by using such a grade of resin whose glass transition point is 320° C. or more.

(Embodiment 3)

Figure 4:
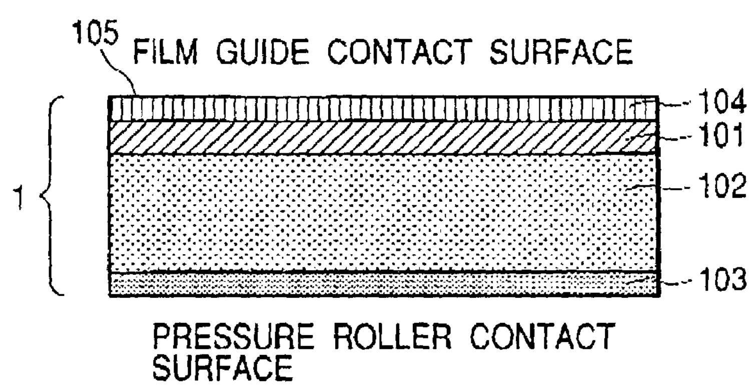
FIG. 4 is a structural diagram of a sleeve according to a third embodiment.

FIG. 4 shows a third embodiment of the present invention.

This is an embodiment that a surface of the sliding layer 104 of the fixing sleeve 1 in the second embodiment shown in FIG. 3 was made a rough surface 105.

This embodiment aims to improve a slip and a stick-slip by providing the resin sliding layer 104 in the inside surface of the sleeve 1 as shown in the second embodiment, performing the surface roughing of the inside surface of the sleeve by mixing roughing particles in this resin, and improving slide property by introducing grease in a nip as shown in the first embodiment.

It becomes possible to prevent the slip and stick-slip that are subjects in a color image fixing apparatus by providing the sliding layer 104 in the inside surface of the sleeve as shown in the second embodiment using a resin grade of resin whose glass transition point is 320° C. or more when the sliding layer 104 is a polyimide resin. In addition, it becomes possible to further increase margins by adding respective effects of the first and second embodiments.

Specifically, it becomes possible to achieve the construction of a fixing apparatus that has a small friction coefficient under high temperature by providing the resin sliding layer 104, whose glass transition point is high, in the inside surface of the sleeve and dispersing roughing particles in this resin sliding layer, and has higher slide property by the convexo-concave of the inside surface of the sleeve carrying grease in the fixing nip.

Hereafter, a sleeve according to the third embodiment will be described.

The sleeve that had been produced by the electroforming method and is shown in the first embodiment was used as the fixing sleeve of this embodiment. In this third embodiment, since it was not necessary to rough the inside surface of a metal layer, a matrix whose surface was flat was used.

A polyimide film was formed in the inside surface of this nickel sleeve as a sliding layer. In this embodiment, "U-varnish S" manufactured by Ube Industries Ltd. was used as polyimide varnish. Moreover, roughing particles were dispersed to this polyimide varnish.

Nevertheless, since the material of the sliding layer 104 is not limited to a polyimide resin in this embodiment, it is also possible to use other heat-resistant resins.

In this embodiment, roughing particles were mixed so as to change its surface property when this polyimide was coated on the inside surface of the sleeve.

Since particles that have good thermostability, good compatibility with polyimide, and proper particle size are desirable as roughing particles, it is considerable to use mica particles, boron nitride particles, silicone particles, a fluorocarbon resin (PTFA particles), metal oxide particles such as titanium oxide, silica, or silicon carbide. Then, a boron nitride resin was used in this embodiment.

It was possible to achieve a sleeve that had inside surface property that Rz was 0.06 $\mu$m by coating and hardening varnish where 10 parts of particles with 0.2 $\mu$m of mean particle diameter were added to polyimide solid components, to the inside surface of the sleeve. In this manner, it is good just to set surface roughness Rz of the inside surface of the sleeve at 0.05 to 0.5 $\mu$m by dispersing roughing particles.

The sleeve produced thus can prevent the slip and stick-slip since proper surface roughness conveys grease into the fixing nip as described in the first embodiment.

As described above, it became possible in this embodiment to prevent a slip and a stick-slip in a color fixing apparatus, where applied pressure was strong and durability was very severe due to the existence of the low-speed print mode by providing the resin sliding layer 104 on the inside surface of the sleeve and dispersing the roughing particles therein.

As described above, it becomes possible to solve the problems by achieving the following construction:

(1) surface roughing of inside surface of sleeve (2) use of polyimide with glass transition point of 320° C. or more for polyimide layer provided on inside surface of sleeve (3) surface roughing by dispersing roughing particles in sliding layer provided on inside surface of sleeve.

In addition, though an electromagnetic induction heating type of fixing apparatus is shown in the above-mentioned embodiment, the present invention is not limited to a heating method, but is applicable to an image heating apparatus that uses a flexible sleeve.

What is claimed is:

1. An image heating apparatus for heating an image formed on a recording material, comprising:

a flexible sleeve;

a sliding member contacting with an inside surface of said flexible sleeve; and a pressure member that sandwiches said flexible sleeve and forms a nip section with said sliding member, the recording material moving between said flexible sleeve and said pressure member, wherein a resin layer is provided on a face contacting with said sliding member of said sleeve and a surface of said resin layer is made a rough surface by particles dispersed in said resin layer.

2. The image heating apparatus according to claim 1, wherein surface roughness Rz of said resin layer is 0.05 to 0.5 $\mu$m.

3. The image heating apparatus according to claim 1, wherein said resin layer is made of polyimide.

4. The image heating apparatus according to claim 3, wherein a glass transition point of said polyimide is at least 320° C.

5. The image heating apparatus according to claim 1, wherein said particles are made of boron nitride.

6. The image heating apparatus according to claim 1, wherein said particles are made of mica.

7. The image heating apparatus according to claim 1, wherein said particles are made of a fluorocarbon resin.

8. The image heating apparatus according to claim 1, wherein said flexible sleeve comprises a metal layer.

9. The image heating apparatus according to claim 8, wherein said flexible sleeve comprises an elastic layer outside said metal layer.

10. The image heating apparatus according to claim 9, wherein said flexible sleeve comprises a releasing layer outside said elastic layer.

11. The image heating apparatus according to claim 8, wherein said apparatus further comprises magnetic field generating means of generating an eddy current in said metal layer to heat said metal layer.

12. The image heating apparatus according to claim 1, wherein thickness of said resin layer is 3 to 100 $\mu$m.

13. The image heating apparatus according to claim 1, wherein a face of said sliding member contacting with said flexible sleeve is a glass layer.

14. The image heating apparatus according to claim 1, wherein said apparatus has a normal mode, and a low-speed mode that rotational speed of said flexible sleeve is slower than that in the normal mode.

15. The image heating apparatus according to claim 1, wherein said sliding member is a heater that generates heat by energization.

16. An image heating apparatus for heating an image formed on a recording material, comprising:

a flexible sleeve having a metal layer;

magnetic field generating means for generating an eddy current in said metal layer;

a sliding member contacting with an inside surface of said flexible sleeve; and a pressure member that sandwiches said flexible sleeve and forms a nip section with said sliding member, the recording material moving between said flexible sleeve and said pressure member, wherein surface roughness Rz of a face of said sleeve contacting with said sliding member is 0.05 to 0.5 μm.

17. The image heating apparatus according to claim 16, wherein said metal layer contacts with said sliding member.

18. The image heating apparatus according to claim 16, wherein a face of said sliding member contacting with said flexible sleeve is a glass layer.

19. The image heating apparatus according to claim 16, wherein said apparatus has a normal mode, and a low-speed mode that rotational speed of said flexible sleeve is slower than that in the normal mode.

* * * * *

UNITED STATES PATENT AND TRADEMARK OFFICE

CERTIFICATE OF CORRECTION

PATENT NO. : 6,998,589 B2
APPLICATION NO. : 10/360689
DATED : February 14, 2006
INVENTOR(S) : Hideyuki Yano et al.

It is certified that error appears in the above-identified patent and that said Letters Patent is hereby corrected as shown below:

COVER PAGE AT ITEM [57] ABSTRACT:
Line 6, “heating” should read --heats--. The second Heating;

COLUMN 3:
Line 46, “in” should read --is--.

COLUMN 4:
Line 4, “Apparatus” should read --apparatus--.

COLUMN 5:
Line 1, “Sleeve,” should read --sleeve,--.
Line 19, “high” should read --highly--.
Line 67, “Is” should read --is--.

COLUMN 6:
Line 43, “thick,” should read --thickness,--.

COLUMN 10:
Line 52, “Inside” should read --inside--.

Signed and Sealed this

Fifteenth Day of August, 2006

JON W. DUDAS
*Director of the United States Patent and Trademark Office*